US012739352B2

(12) United States Patent
Chen

(10) Patent No.: US 12,739,352 B2
(45) Date of Patent: Sep. 15, 2026

(54) IMAGE PROCESSING METHOD AND APPARATUS

(71) Applicant: Yinwang Intelligent Technologies Co., Ltd., Shenzhen (CN)

(72) Inventor: Kang Chen, Hangzhou (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 246 days.

(21) Appl. No.: 18/596,829

(22) Filed: Mar. 6, 2024

(65) Prior Publication Data

US 2024/0223737 A1 Jul. 4, 2024

Related U.S. Application Data

(63) Continuation of application No. PCT/CN2021/117049, filed on Sep. 7, 2021.

(51) Int. Cl.

| | |
|---|---|
| ***H04N 9/73*** | (2023.01) |
| ***G06T 7/11*** | (2017.01) |
| ***G06T 7/13*** | (2017.01) |
| ***G06T 7/90*** | (2017.01) |
| ***G06V 10/25*** | (2022.01) |

(52) U.S. Cl.

CPC ................ *H04N 9/73* (2013.01); *G06T 7/11* (2017.01); *G06T 7/13* (2017.01); *G06T 7/90* (2017.01); *G06V 10/25* (2022.01); *G06T 2207/10024* (2013.01); *G06V 2201/07* (2022.01)

(58) Field of Classification Search

CPC .. H04N 9/73; H04N 23/88; G06T 7/11; G06T 7/13; G06T 7/90; G06T 2207/10024; G06V 10/25; G06V 2201/07

See application file for complete search history.

(56) References Cited

U.S. PATENT DOCUMENTS

| | | | | |
|---|---|---|---|---|
| 8,786,729 | B2 * | 7/2014 | Peng | H04N 23/88 348/222.1 |
| 11,064,135 | B2 * | 7/2021 | Sugimoto | G03B 7/18 |
| 11,064,174 | B2 * | 7/2021 | Yuan | G06T 7/50 |
| 11,128,908 | B2 * | 9/2021 | Whang | H04N 21/42204 |
| 11,295,421 | B2 * | 4/2022 | Sun | G06T 5/92 |

(Continued)

FOREIGN PATENT DOCUMENTS

| | | |
|---|---|---|
| CN | 103200410 B | 7/2015 |
| CN | 106303250 A | 1/2017 |

(Continued)

*Primary Examiner* — Tom Y Lu

(74) *Attorney, Agent, or Firm* — WOMBLE BOND DICKINSON (US) LLP

(57) ABSTRACT

Embodiments of this application disclose an image processing method and an apparatus. The method includes: obtaining an image, where the image includes a detection object; performing region division on the image based on the detection object to obtain image regions, where the obtained image regions include a first region and a second region, and the first region includes the detection object, and the second region does not include the detection object; and performing white balance correction on the image based on a color temperature value of the first region and a color temperature value of the second region. According to this solution, a white balance processing effect of an image can be improved, and display quality of the image can be improved.

20 Claims, 9 Drawing Sheets

(56) References Cited

U.S. PATENT DOCUMENTS

| | | | | |
|---|---|---|---|---|
| 11,503,228 | B2 * | 11/2022 | Zhang | G06V 20/64 |
| 2010/0208099 | A1 | 8/2010 | Nomura | |
| 2011/0234845 | A1 * | 9/2011 | Fujiwara | H04N 23/88 348/E9.051 |
| 2020/0053332 | A1 | 2/2020 | Seok | |
| 2021/0266507 | A1 | 8/2021 | Watanabe | |

FOREIGN PATENT DOCUMENTS

| | | | |
|---|---|---|---|
| CN | 112601063 | A | 4/2021 |
| WO | 2019216072 | A1 | 11/2019 |

* cited by examiner

IMAGE PROCESSING METHOD AND APPARATUS

CROSS-REFERENCE TO RELATED APPLICATION

This application is a continuation of International Patent Application No. PCT/CN2021/117049, filed on Sep. 7, 2021, the disclosure of which is hereby incorporated by reference in its entirety.

TECHNICAL FIELD

This application relates to the field of sensor technologies, and in particular, to an image processing method and an apparatus.

BACKGROUND

In an image processing process, white balance processing is usually performed on an image to enable a neutral color (for example, white and gray) to be correctly displayed. The white balance processing can restore white and gray objects photographed under light sources with different color temperatures (a blue color cast at a high color temperature; and a red color cast at a low color temperature) to white and gray.

A procedure of white balance processing is usually as follows: First, pixels represented by an actually gray object in an image are identified, then corresponding white balance gains are calculated based on a color cast degree of these pixels, and then these pixels are restored to gray by using the white balance gains. However, if light sources with different color temperatures exist in a photographing environment, color temperatures of different regions in a shot image differ greatly. Consequently, white balance gains determined in this manner may be inaccurate, and a color cast may occur in the entire image.

SUMMARY

Embodiments of this application provide an image processing method and an apparatus, to improve a white balance processing effect of an image.

According to a first aspect, this application provides an image processing method. The method includes: obtaining an image, where the image includes a detection object; performing region division on the image based on the detection object to obtain image regions, where the obtained image regions include a first region and a second region, the first region includes the detection object, and the second region does not include the detection object; and performing white balance correction on the image based on a color temperature value of the first region and a color temperature value of the second region. According to this solution, a white balance processing effect of an image can be improved, and display quality of the image can be improved.

For example, the image may be a picture, a photo, a video, streaming media, or the like.

In an embodiment, the performing white balance correction on the image based on a color temperature value of the first region and a color temperature value of the second region includes: if a difference between the color temperature value of the first region and the color temperature value of the second region is greater than a preset threshold, determining, based on the color temperature value of the first region, a first white balance gain coefficient corresponding to the first region, and determining, based on the color temperature value of the second region, a second white balance gain coefficient corresponding to the second region; and performing white balance correction on the image based on the first white balance gain coefficient and the second white balance gain coefficient. A value of the preset threshold may be preset, or a user may adjust the value of the preset threshold.

In an embodiment, the method further includes: if the difference between the color temperature value of the first region and the color temperature value of the second region is not greater than the preset threshold, determining a color temperature value of the image based on the color temperature value of the first region and the color temperature value of the second region; determining a third white balance gain coefficient corresponding to the color temperature value of the image; and performing white balance correction on the image based on the third white balance gain coefficient.

In an embodiment, the determining a color temperature value of the image based on the color temperature value of the first region and the color temperature value of the second region includes: determining a first weight based on an area proportion of the first region in the image, and determining a second weight based on an area proportion of the second region in the image; and determining the color temperature value of the image based on the color temperature value of the first region, the color temperature value of the second region, the first weight, and the second weight.

In an embodiment, the performing white balance correction on the image based on a color temperature value of the first region and a color temperature value of the second region includes: determining, based on the color temperature value of the first region, a first white balance gain coefficient corresponding to the first region, and determining, based on the color temperature value of the second region, a second white balance gain coefficient corresponding to the second region; and if a difference between the color temperature value of the first region and the color temperature value of the second region is greater than a preset threshold, performing white balance correction on the image based on the first white balance gain coefficient and the second white balance gain coefficient; or if a difference between the color temperature value of the first region and the color temperature value of the second region is not greater than a preset threshold, determining a fourth white balance gain coefficient based on the first white balance gain coefficient and the second white balance gain coefficient; and performing white balance correction on the image based on the fourth white balance gain coefficient.

In an embodiment, the determining a fourth white balance gain coefficient based on the first white balance gain coefficient and the second white balance gain coefficient includes: determining a first weight based on an area proportion of the first region in the image, and determining a second weight based on an area proportion of the second region in the image; and determining the fourth white balance gain coefficient based on the first white balance gain coefficient, the second white balance gain coefficient, the first weight, and the second weight.

In an embodiment, the performing region division on the image based on the detection object includes: performing region division on the image based on a contour line of the detection object.

In an embodiment, the obtained image region further includes a critical region, and the critical region includes the contour line; and the performing white balance correction on the image based on a color temperature value of the first region and a color temperature value of the second region includes: if the difference between the color temperature value of the first region and the color temperature value of the second region is greater than the preset threshold, determining, based on the color temperature value of the first region, the first white balance gain coefficient corresponding to the first region, and determining, based on the color temperature value of the second region, the second white balance gain coefficient corresponding to the second region; determining a fifth white balance gain coefficient based on the first white balance gain coefficient and the second white balance gain coefficient, where the fifth white balance gain coefficient is used to correct the critical region; and performing white balance correction on the image based on the first white balance gain coefficient, the second white balance gain coefficient, and the fifth white balance gain coefficient.

In an embodiment, the performing region division on the image based on a contour line of the detection object includes: generating a first bounding box of the detection object; determining, in an image region included in a second bounding box, a region contour line that includes a largest image area as the contour line of the detection object, where the second bounding box is obtained by extending the first bounding box outwards; and performing region division on the image based on the contour line of the detection object, where the first region is an image region included in the contour line, and the second region is an image region outside the contour line.

In an embodiment, before the performing region division on the image based on the detection object, the method includes: determining that a current location is close to a preset location. A processing module may detect an environment in which a mobile station is currently located, and perform region division processing on an image when determining that region division processing needs to be performed on the obtained image.

According to a second aspect, this application provides a processing apparatus. The processing apparatus includes an obtaining unit and a processing unit. The obtaining unit is configured to obtain an image, where the image includes a detection object; the processing unit is configured to perform region division on the image based on the detection object to obtain image regions, where the obtained image regions include a first region and a second region, the first region includes the detection object, and the second region does not include the detection object; and the processing unit is further configured to perform white balance correction on the image based on a color temperature value of the first region and a color temperature value of the second region.

In an embodiment, the processing unit is configured to: if a difference between the color temperature value of the first region and the color temperature value of the second region is greater than a preset threshold, determine, based on the color temperature value of the first region, a first white balance gain coefficient corresponding to the first region, and determine, based on the color temperature value of the second region, a second white balance gain coefficient corresponding to the second region; and perform white balance correction on the image based on the first white balance gain coefficient and the second white balance gain coefficient.

In an embodiment, the processing unit is further configured to: if the difference between the color temperature value of the first region and the color temperature value of the second region is not greater than the preset threshold, determine a color temperature value of the image based on the color temperature value of the first region and the color temperature value of the second region; determine a third white balance gain coefficient corresponding to the color temperature value of the image; and perform white balance correction on the image based on the third white balance gain coefficient.

In an embodiment, the processing unit is configured to: determine a first weight based on an area proportion of the first region in the image, and determine a second weight based on an area proportion of the second region in the image; and determine the color temperature value of the image based on the color temperature value of the first region, the color temperature value of the second region, the first weight, and the second weight.

In an embodiment, the processing unit is configured to: determine, based on the color temperature value of the first region, a first white balance gain coefficient corresponding to the first region, and determine, based on the color temperature value of the second region, a second white balance gain coefficient corresponding to the second region; and if a difference between the color temperature value of the first region and the color temperature value of the second region is greater than a preset threshold, perform white balance correction on the image based on the first white balance gain coefficient and the second white balance gain coefficient; or if a difference between the color temperature value of the first region and the color temperature value of the second region is not greater than a preset threshold, determine a fourth white balance gain coefficient based on the first white balance gain coefficient and the second white balance gain coefficient; and perform white balance correction on the image based on the fourth white balance gain coefficient.

In an embodiment, the processing unit is configured to: determine a first weight based on an area proportion of the first region in the image, and determine a second weight based on an area proportion of the second region in the image; and determine the fourth white balance gain coefficient based on the first white balance gain coefficient, the second white balance gain coefficient, the first weight, and the second weight.

In an embodiment, the processing unit is configured to perform region division on the image based on a contour line of the detection object.

In an embodiment, the obtained image region further includes a critical region, and the critical region includes the contour line; and the processing unit is configured to: if the difference between the color temperature value of the first region and the color temperature value of the second region is greater than the preset threshold, determine, based on the color temperature value of the first region, the first white balance gain coefficient corresponding to the first region, and determine, based on the color temperature value of the second region, the second white balance gain coefficient corresponding to the second region; determine a fifth white balance gain coefficient based on the first white balance gain coefficient and the second white balance gain coefficient, where the fifth white balance gain coefficient is used to correct the critical region; and perform white balance correction on the image based on the first white balance gain coefficient, the second white balance gain coefficient, and the fifth white balance gain coefficient.

In an embodiment, the processing unit is configured to: generate a first bounding box of the detection object; determine, in an image region included in a second bounding box, a region contour line that includes a largest image area as the contour line of the detection object, where the second bounding box is obtained by extending the first bounding box outwards; and perform region division on the image based on the contour line of the detection object, where the first region is an image region included in the contour line, and the second region is an image region outside the contour line.

In an embodiment, the processing apparatus further includes a determining unit. The determining unit is configured to determine that a current location is close to a preset location.

According to a third aspect, this application provides a processing apparatus. The processing apparatus includes a processor and a memory. The memory is configured to store program code. The processor is configured to invoke the program code in the memory to perform the method according to any one of the first aspect or the possible embodiments of the first aspect.

According to a fourth aspect, this application provides a computer-readable storage medium. The computer-readable storage medium is configured to store instructions; and when the instructions are executed, the method according to any one of the first aspect or the possible embodiments of the first aspect is performed.

According to the solutions of this application, when the image including the detection object is obtained, the processing module performs region division on the image based on the detection object to obtain image regions, and the obtained image regions include the first region and the second region. Because the color temperature value of the first region is different from the color temperature value of the second region, white balance correction is performed on the image based on the color temperature values of the two regions, so that white balance correction processing can be better performed on the image, and a display effect of the image can be improved.

BRIEF DESCRIPTION OF DRAWINGS

To describe technical solutions in embodiments of this application more clearly, the following briefly describes the accompanying drawings used in describing embodiments or the conventional technology.

DESCRIPTION OF EMBODIMENTS

The following describes the technical solutions in embodiments of this application in more detail.

The terms used in the following embodiments of this application are merely for the purpose of describing embodiments, but are not intended to limit this application. As used in the specification of this application and the appended claims, a singular expression "a", "an", "the", "the foregoing", "this", or "such a" is intended to also include a plural expression unless otherwise clearly indicated in the context. It should be further understood that, the term "and/or" used in this application indicates and includes any and all possible combinations of one or more of the listed items. In this application, the term "a plurality of" means two or more than two.

It should be noted that, in the specification, claims, and accompanying drawings of this application, the terms "first", "second", "third", and the like are intended to distinguish between similar objects but do not necessarily indicate an order or sequence. It should be understood that data used in such a way is interchangeable in a proper circumstance, so that embodiments of this application described herein can be implemented in other orders than the order illustrated or described herein. Moreover, the terms "include" and any other variants mean to cover the non-exclusive inclusion, for example, a process, method, system, product, or device that includes a list of operations or units is not necessarily limited to those operations or units, but may include other operations or units not expressly listed or inherent to such a process, method, product, or device.

Figure 1:
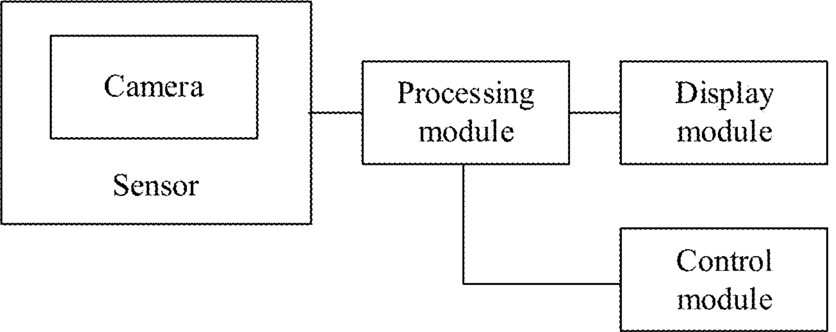
FIG. 1 is a schematic diagram of a structure of a system of a mobile station according to an embodiment of this application.

Embodiments of this application may be applied to an architecture of a system of a mobile station shown in FIG. 1. The mobile station may be a vehicle, a robot, an unmanned aerial vehicle, or the like. The system includes a sensor, a processing module, a display module, and a control module. The following further describes each module or component.

Sensor: Sensors are classified into two types based on measurement objects. One type is configured to measure a status of the mobile station, and the other type is configured to measure a status of an environment in which the mobile station is located. The former may include a global positioning system (GPS), a speed sensor, an acceleration sensor, an angular velocity sensor, a torque sensor, or the like. In addition, some sensors may further exist in the mobile station to collect more information related to running (or referred to as traveling or flight) of the mobile station, for example, an engine running condition, a running temperature of each module or component, an intake air pressure, and an intake air temperature. The latter may include a camera, a lidar sensor, a millimeter-wave radar sensor, an ultrasonic sensor, or the like. These sensors can collect information about the environment in which the mobile station is located. Various types of information collected by the sensor may be converted into an electrical signal, and transmitted to a control module of the mobile station. After analyzing the electrical signal, the control module outputs a control instruction for the mobile station or outputs some operation suggestions to a user, to assist the user in controlling the mobile station. Therefore, accuracy of information collected by the sensor may affect a control decision output by the control module.

In one embodiment, a camera is used as a sensor, and may collect, by shooting an image of an environment in which a mobile station is located, information about the environment in which the mobile station is located. For example, the camera is configured to collect road condition information in front of the mobile station in a traveling process of the mobile station. In some other examples, the camera is further configured to collect a reversing image, a traveling record image, or the like of the mobile station. In an embodiment, the camera may be a monocular camera, a binocular camera, a multi-ocular camera, a wide-angle camera, an around-view camera, or the like.

Processing module: The processing module may process images captured by the camera, and is configured to optimize quality of these images, to provide a better image effect for a display module, an adjustment module, and the like. For example, the processing module may be an image signal processing (ISP) module. For example, the processing module may perform processing such as backlight compensation (BLC), Demosaic algorithm processing, noise reduction (NR) processing, and automatic white balance (AWB) on the image.

Display module: The display module is configured to display image information processed by the processing module. For example, the display module may be a vehicle-mounted around-view display system. The vehicle-mounted around-view display system synthesizes images (after being processed by the processing module) provided by four wide-angle cameras installed in the front and the rear of and on both sides of a vehicle into a top view of the vehicle, and displays the top view on an instrument panel display in the vehicle. The top view of the vehicle provides more intuitive image information of assisted driving for vehicle driving, and is of great significance for vehicle assisted driving and vehicle safety. In another example, the display module may alternatively be a driving recorder. The driving recorder displays, on a display interface of the driving recorder, an image (after being processed by the processing module) provided by a camera installed in the front of the vehicle. The driving recorder may display and record road condition information when the vehicle is traveling, and ensure safety of the vehicle and protect legitimate rights and interests of a driver.

Adjustment module: The adjustment module is configured to control/adjust a traveling status of the mobile station. For example, the adjustment module may be an advanced driver assistant system (ADAS), a vehicle control unit (VCU), or the like. For example, the ADAS may use environmental data inside and outside the vehicle collected by a sensor such as a camera, radar, laser, and ultrasonic waves to identify a static object and a dynamic object, and perceive a driving intention of the vehicle through technical processing such as detection and tracking. The VCU is a control unit for implementing a vehicle control decision, and may determine a driving intention of a driver by collecting signals of an accelerator pedal, a gear, a brake pedal, a steering wheel angle, and the like. The VCU monitors information about a vehicle status (a vehicle speed, a temperature, and the like), sends a running status control instruction to a power system and a power battery system after determining and processing the information, and controls a working mode of an electric power system of a vehicle-mounted accessory. The VCU has a fault diagnosis function, a protection function, and a storage function for a vehicle system. In some possible implementations, the ADAS may include an image perception module, and the image perception module may identify a static object and a dynamic object, and may further identify a detection object. For example, the detection object may be an obstacle and a traffic indication sign (for example, a traffic sign, a traffic light, and a lane line) existing in an environment in which the mobile station is traveling. In embodiments of this application, the detection object of the image perception module may alternatively be the inside of a parking lot, the inside of a tunnel, or the like.

In an embodiment, the processing module may be an independent module, or may be a component integrated into the display module or the adjustment module. This is not limited in embodiments of this application.

It should be noted that the modules shown in FIG. 1 are merely examples. In an actual application scenario, the mobile station may include more or fewer modules or components. This is not limited in embodiments of this application. For example, the mobile station may further include an input module, and the input module is configured to receive control information for the mobile station. For example, the control information includes steering wheel angle information, driving gear information, driving, and braking information, and the like.

In some other possible implementations, embodiments of this application may be further applied to a distributed sensor network or a non-mobile platform, for example, a street lamp or a traffic light. Related fields include a smart junction, a smart city, and the like. For example, a camera disposed on a street lamp and a traffic light may collect road condition information of a traffic region. In embodiments of this application, image information obtained by the camera disposed on these non-mobile platforms may also be processed.

The following describes some concepts related to image processing.

1. Color Temperature

Color temperature is a unit of measurement that indicates a color component contained in light. In theory, a black body temperature refers to a color represented by an absolute black body after the absolute black body is heated from absolute zero (−273° C.). After the black body is heated, the black body gradually turns from black to red, yellow, white, and finally emits blue light. When the black body is heated to a particular temperature, a spectral component contained in light emitted by the black body is referred to as a color temperature at this temperature, and the unit of measurement is "K" (Kelvin).

If light emitted by a light source contains a same spectral component as light emitted by the black body at a particular temperature, a color temperature of the light emitted by the light source is referred to as a K color temperature. For example, if a color of light emitted by a 100 W bulb is the same as a color of the absolute black body at 2527° ° C., a color temperature of the light emitted by the bulb is (2527+273) K=2800 K.

When natural light is used for photographing, color temperatures of light in different time periods are different, and therefore colors of taken photos are also different. For example, when a photo is taken under a clear blue sky, a color temperature of light is high, the photo is in a cool tone. When a photo is taken at dusk, a color temperature of light is low, the photo is in a warm tone. When artificial light is used for photographing, a case in which photos taken under different types of light sources have different tones may also occur.

2. White Balance

In an image processing process, white balance processing is usually performed on an image to enable a neutral color (for example, white and gray) to be correctly displayed. In other words, the neutral color may be restored to the neutral color regardless of light sources. The white balance processing can restore white and gray objects photographed under light sources with different color temperatures (a blue color cast at a high color temperature; and a red color cast at a low color temperature) to white and gray.

A procedure of white balance processing is usually as follows: First, pixels represented by an actually gray object in an image are identified, then corresponding white balance gains are calculated based on a color cast degree of these pixels, and then these pixels are restored to gray by using the white balance gains.

Currently, white balance processing is performed on an image, so that a color of an object can be restored in the image as much as possible. However, if light sources with different color temperatures exist in a photographing environment, color temperatures of different regions in a shot image differ greatly. Consequently, white balance gains determined in this manner may be inaccurate, and a color cast may occur in the entire image. In view of this, the method in embodiments of this application is provided.

According to an image processing method and an apparatus provided in this application, a display effect of an image can be improved. When the method or the apparatus is applied to a terminal, a display capability and a perception capability of the terminal can be improved.

Figure 2:
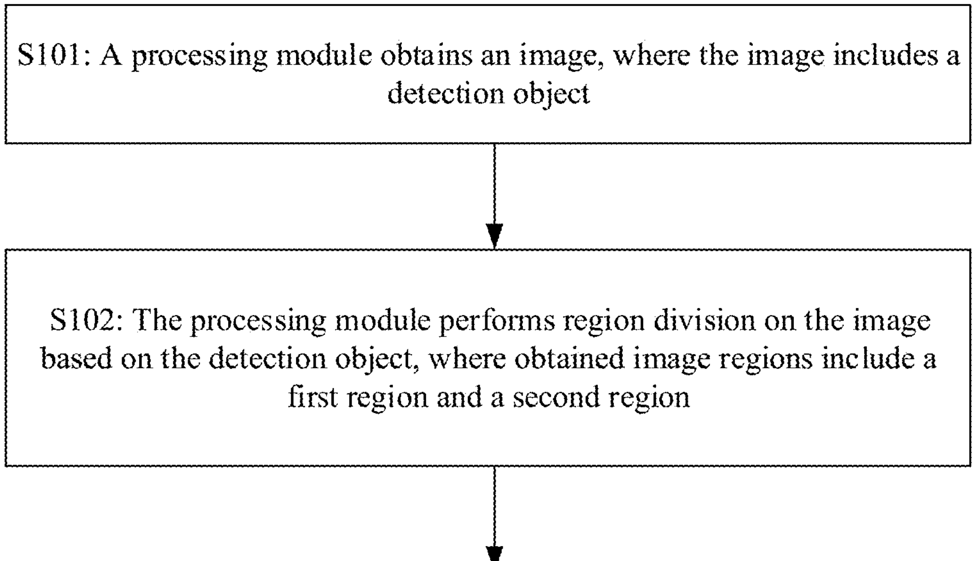
FIG. 2 is a flowchart of an image processing method according to an embodiment of this application.

FIG. 2 is a flowchart of an image processing method according to an embodiment of this application. The method may be implemented based on the system shown in FIG. 1. A processing module described below may be an independent module, or may be a component integrated into a display module or an adjustment module. The method includes but is not limited to the following operations.

S101: The processing module obtains an image, where the image includes a detection object.

Figure 3:
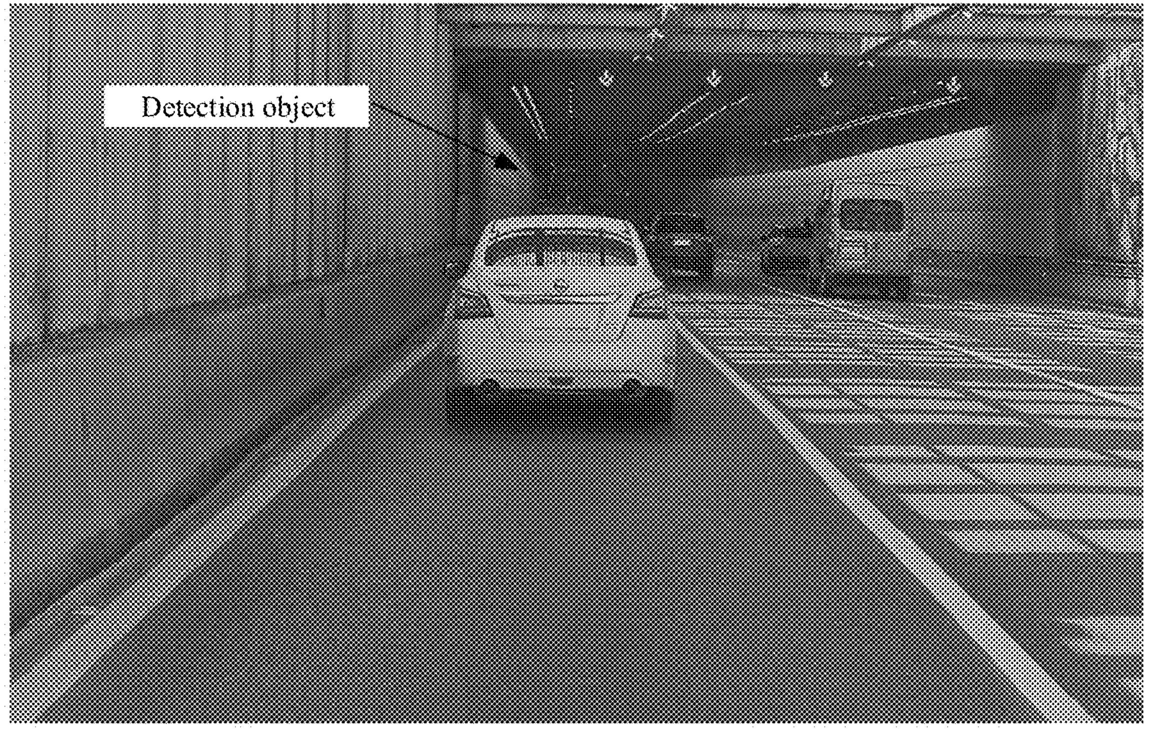
FIG. 3 is a schematic diagram of an image including a detection object according to an embodiment of this application.

For example, the image may be a picture, a photo, a video, streaming media, or the like. The detection object may be the inside of a parking lot, the inside of a tunnel, or the like. In a natural light photographing environment, a light source outside the parking lot or the tunnel is natural light of the sun, and a light source inside the parking lot or the tunnel is a light installed inside the parking lot or the tunnel. Color temperatures of the two light sources differ greatly. It should be noted that the detection object in this embodiment of this application is not limited to the foregoing examples. The inside of an object (or referred to as a building) on which there may be a scenario with a large color temperature difference may be considered as the detection object. For example, FIG. 3 is a schematic diagram of an image including a detection object according to an embodiment of this application. In FIG. 3, the detection object is the inside of the tunnel.

In a possible implementation, the processing module may obtain the image by using a camera of a mobile station. For example, the camera of the mobile station may continuously obtain an image of an environment in which the mobile station is located, and then transmit the image to the processing module for processing.

S102: The processing module performs region division on the image based on the detection object to obtain image regions, where the obtained image regions include a first region and a second region.

The first region includes the detection object, and the second region does not include the detection object. In this division manner, the image may be divided into at least two regions. Because a color temperature of the first region that includes the detection object is different from a color temperature of the second region that does not include the detection object, image regions whose color temperatures are different may be distinguished.

In an embodiment, before that the processing module performs region division on the image based on the detection object, the processing module may detect an environment in which the mobile station is currently located, and determine whether region division processing needs to be performed on the obtained image. It may be understood that, if the mobile station is close to the detection object, for example, when the mobile station is about to enter or leave a parking lot or a tunnel, because an environmental image obtained by the camera is affected by light sources of two color temperatures, region division processing needs to be performed on the environmental image. If there is only one light source in the environment in which the mobile station is located, for example, the mobile station travels on an unblocked road, environmental image obtained by the camera is affected by only one light source, and the processing module may process the environmental image as a whole, and does not perform a region division operation.

In a possible implementation, before operation S102 is performed, the method includes: determining that a current location is close to a preset location. The preset location may be a location corresponding to the detection object, for example, a parking lot, a tunnel, or the like. That a current location is close to a preset location may be understood as that a distance between a current geographical location of the mobile station and the preset location is less than or equal to a preset distance, and the preset distance may be determined in advance.

In an embodiment, the processing module may perform information communication with a module such as a GPS and a high-definition map. For example, the module such as the GPS and the high-definition map may send the distance between the current geographical location of the mobile station and the preset location to the processing module. The processing module may determine, based on the distance, whether the current location is close to the preset location. In another example, when it is determined that the distance between the current geographical location of the mobile station and the preset location is less than or equal to the preset distance, the module such as the GPS and the high-definition map may send an indication message to the processing module, where the indication message indicates the processing module to perform region division on the obtained image based on the detection object.

Figure 4:
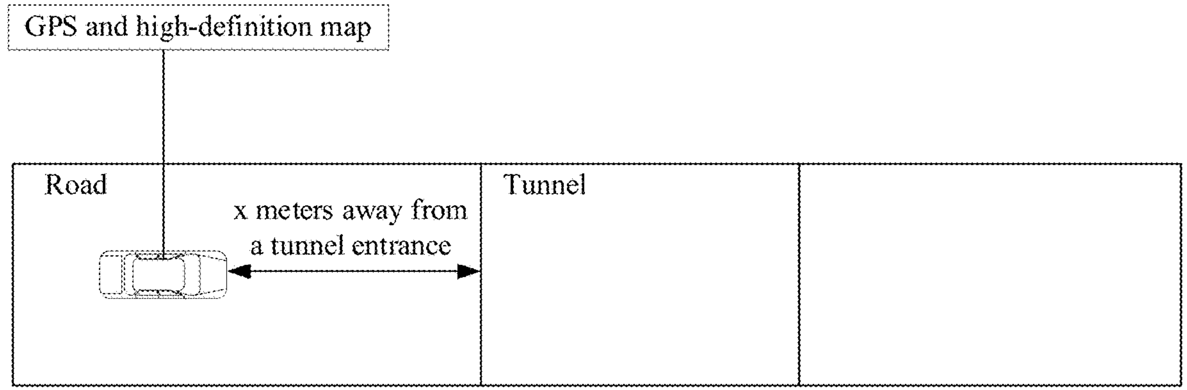
FIG. 4 is a schematic diagram of an application scenario according to an embodiment of this application.

For example, FIG. 4 is a schematic diagram of an application scenario according to an embodiment of this application. In FIG. 4, the module such as the GPS and the high-definition map in a vehicle may determine a physical location of the vehicle, and feed back the distance to the processing module.

In another possible implementation, the mobile station further includes an image perception module. The image perception module may identify a detection object in an environment. When the image perception module identifies that the detection object exists in the environment in which the mobile station is currently located (or identifies that an area proportion of the detection object in the image is not less than a preset area proportion), the image perception module may send an indication message to the processing module, where the indication message indicates the processing module to perform region division on the obtained image based on the detection object. The processing module may perform information communication with the image perception module. In an embodiment, the image perception module may further send coordinates of the identified detection object in an image (a previously obtained image, for example, an image of a previous frame) to the processing module, to assist the processing module in performing region division processing on a currently obtained image.

The following describes in more detail a manner in which the processing module performs region division on the image based on the detection object.

In a possible implementation, the manner of performing region division on the image based on the detection object may be: performing region division on the image based on a contour line of the detection object. In one embodiment, the first region is an image region included in the contour line, and the second region is an image region outside the contour line. Subsequently, a method for generating the contour line of the detection object is described. The method may include the following operations.

Operation a1: Generate a first bounding box of the detection object.

In a possible implementation, the processing module first processes the obtained image as a grayscale image. For example, the image obtained by the processing module is a 24-bit RGB image, and the processing module linearly maps the 24-bit RGB image to 8 bits, and then performs a grayscale operation on the 8-bit RGB image to convert the 8-bit RGB image into a grayscale image. Then, the processing module converts the grayscale image into a binary image based on a specified binary segmentation threshold, where a value range of the threshold is [0, 255]. In one embodiment, in a conversion process, 0 is assigned to a pixel whose grayscale is less than or equal to the threshold, and 1 is assigned to a pixel whose grayscale is greater than the threshold. Finally, the processing module performs edge extraction processing on the binary image including 0 and 1, to highlight a contour edge in the image, and a bounding box of the contour edge is the first bounding box of the detection object. It should be noted that the processing module may alternatively generate the first bounding box in another manner. This is not limited in this embodiment of this application.

Figure 5:
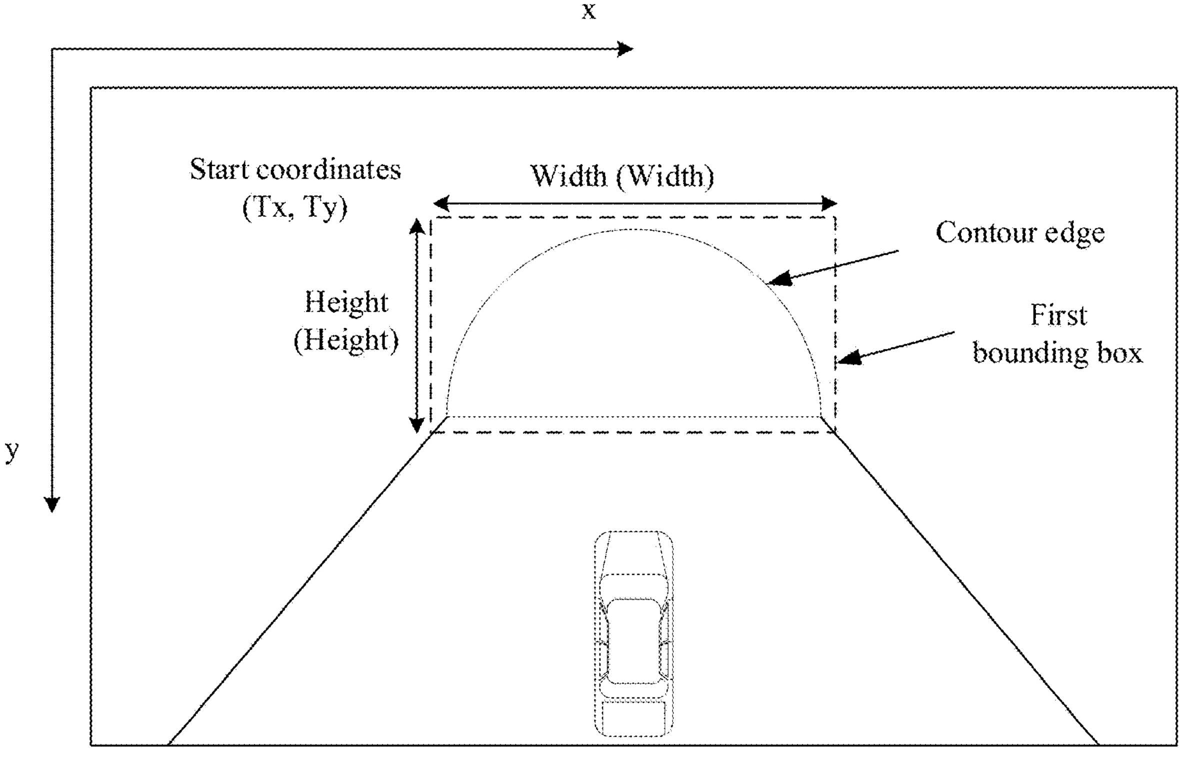
FIG. 5 is a schematic diagram of a first bounding box according to an embodiment of this application.

For example, FIG. 5 is a schematic diagram of the first bounding box according to an embodiment of this application. In FIG. 5, the first bounding box is a bounding box of the contour edge. In the image, a rectangular coordinate system is established by using the top left corner of the image as a coordinate origin, and an x-axis and a y-axis are respectively parallel to two sides of the image. The processing module may record start coordinates (Tx, Ty) of the first bounding box (namely, coordinates of the top left corner of the first bounding box), a width (Width) of the first bounding box, and a height (Height) of the first bounding box.

Operation a2: Extend the first bounding box outwards to obtain a second bounding box.

In a possible case, the first bounding box may be determined by the processing module based on the currently obtained image.

In another possible case, the first bounding box may alternatively be determined by the processing module based on the previously obtained image, for example, the image of the previous frame or another image close to the current moment. In consideration that the mobile station is continuously moving, a location of the detection object in the image is in a continuous changing process. Therefore, in the current image, a bounding box of the detection object may be different from the first bounding box. Based on this, to obtain a more accurate contour line of the detection object, the processing module may extend the first bounding box outwards to obtain the second bounding box. Extending the first bounding box outwards to obtain the second bounding box means that the second bounding box includes the first bounding box, and a width of the second bounding box is greater than the width of the first bounding box, and/or a height of the second bounding box is greater than the height of the first bounding box. For example, on the basis of the upper, lower, left, and right boundaries of the first bounding box, a preset quantity of pixels may be moved outwards, and a bounding box formed by moved boundaries is used as the second bounding box.

Figure 6:
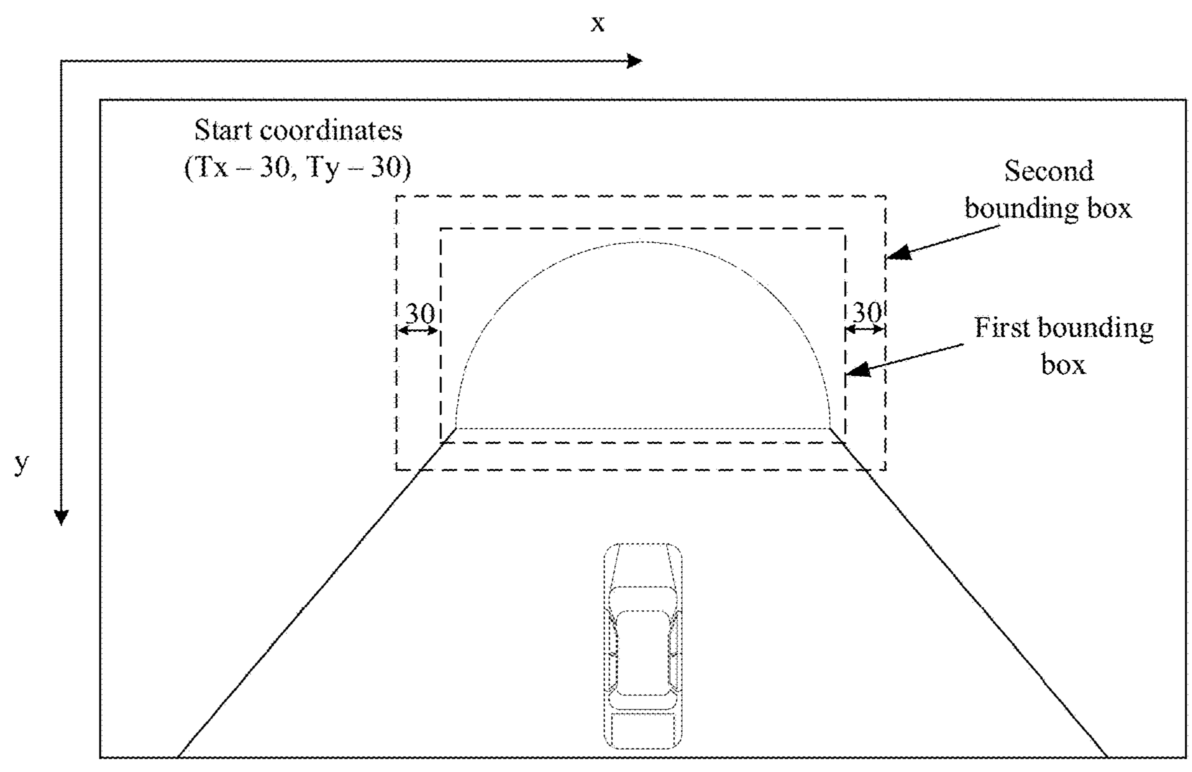
FIG. 6 is a schematic diagram of a first bounding box and a second bounding box according to an embodiment of this application.

For example, FIG. 6 is a schematic diagram of the first bounding box and the second bounding box according to an embodiment of this application. In FIG. 6, the second bounding box is a bounding box formed after the upper, lower, left, and right boundaries of the first bounding box are moved outwards by 30 pixels. Start coordinates of the first bounding box are (Tx, Ty), the width of the first bounding box is Width, and the height of the first bounding box is Height. In this case, start coordinates of the second bounding box are (Tx−30, Ty−30), the width of the second bounding box is Width+60, and the height of the second bounding box is Height+60.

Operation a3: Determine, in an Image Region Included in the Second Bounding Box, a Region Contour Line that Includes a Largest Image Area as the Contour Line of the Detection Object.

S103: The processing module performs white balance correction on the image based on a color temperature value of the first region and a color temperature value of the second region.

Figure 7:
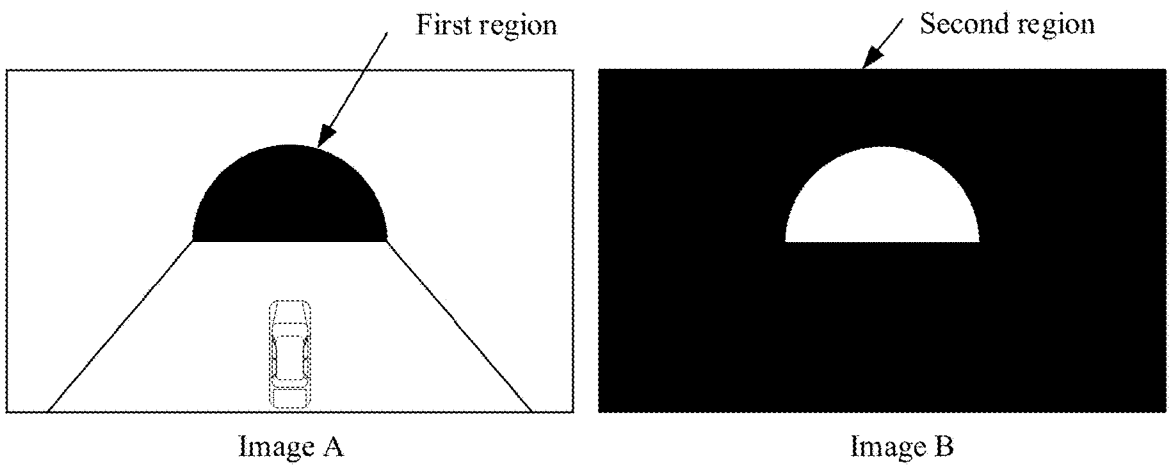
FIG. 7 is a schematic diagram of an image A and an image B according to an embodiment of this application.

First, a possible manner in which the processing module determines the color temperature value of the first region and the color temperature value of the second region is described. The processing module may copy an obtained RGB image into two images (for example, the two images are an image A and an image B). Then, the processing module sets all RGB values of pixels in a first region of the image A to 0, and sets all RGB values of pixels in a second region of the image B to 0. During gray point counting for white balance, a black point whose RGB value is set to 0 may be excluded. In this manner, a color temperature value of the first region and a color temperature value of the second region do not affect each other. For example, FIG. 7 is a schematic diagram of the image A and the image B according to an embodiment of this application. The processing module calculates the color temperature value of the second region based on the image A, and calculates the color temperature value of the first region based on the image B.

An example in which the color temperature value of the second region is calculated based on the image A is used to describe a manner of calculating a color temperature value of an image.

Operation b1: Calculate an R/G ratio and a B/G ratio of each pixel in the image A, and count a point falling within a specified gray point region range (including an R/G range and a B/G range) as a gray point.

Figure 8:
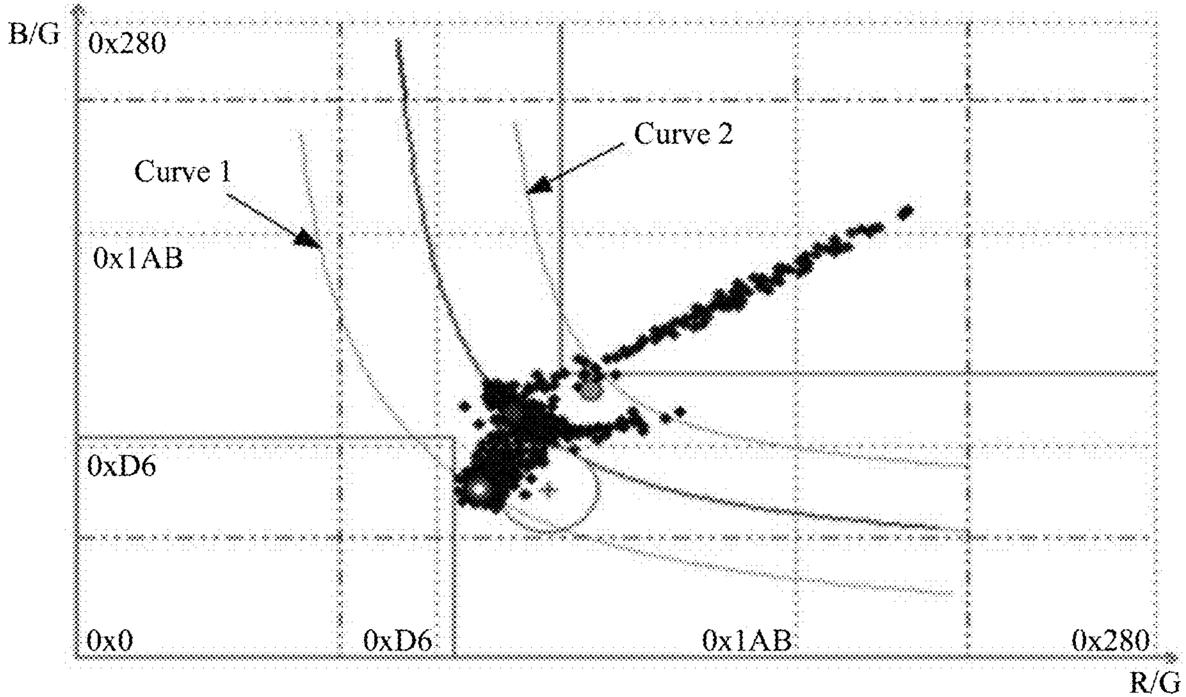
FIG. 8 is a schematic diagram of R/G (Red/Green) values and B/G (Blue/Green) values of pixels according to an embodiment of this application.

For example, FIG. 8 is a schematic diagram of R/G values and B/G values of pixels according to an embodiment of this application. In FIG. 8, a horizontal coordinate represents R/G, a vertical coordinate represents B/G, each falling point represents a falling point of the R/G ratio and the B/G ratio of each pixel in a coordinate system, and a region between a curve 1 and a curve 2 is a specified gray point region range. A pixel corresponding to a point that falls within the specified gray point region range is a gray point. It should be noted that during gray point counting for white balance, a black point whose RGB value is set to 0 may be excluded.

Operation b2: Assign a calculation weight to each gray point based on a difference between a preset gray point range center and an R/G ratio and a B/G ratio of the gray point obtained through counting in operation b1, and then perform weighted calculation to obtain an R/G value and a B/G value of the entire image.

Operation b3: Substitute the R/G value and the B/G value of the entire image that are obtained in operation b2 into a color temperature fitting result calibrated at a standard color temperature, to obtain a color temperature value of the image A, namely, the color temperature value of the second region.

In addition, the color temperature value of the first region may be calculated based on the image B in a similar manner. Because the color temperature value of the first region is different from the color temperature value of the second region, white balance correction is performed on the image based on the color temperature values of the two regions, so that the white balance correction can be better performed on the image.

In a possible implementation, the processing module may perform white balance correction on the image based on the color temperature value of the first region and the color temperature value of the second region in the following manners. If a difference between the color temperature value of the first region and the color temperature value of the second region is greater than a preset threshold, the processing module determines, based on the color temperature value of the first region, a first white balance gain coefficient corresponding to the first region, and determines, based on the color temperature value of the second region, a second white balance gain coefficient corresponding to the second region; and performs white balance correction on the image based on the first white balance gain coefficient and the second white balance gain coefficient; or if a difference between the color temperature value of the first region and the color temperature value of the second region is not greater than a preset threshold, the processing module determines a color temperature value of the image based on the color temperature value of the first region and the color temperature value of the second region; determines a third white balance gain coefficient corresponding to the color temperature value of the image; and performs white balance correction on the image based on the third white balance gain coefficient.

A value of the preset threshold may be preset, or a user may adjust the value of the preset threshold.

In an embodiment, the processing module may determine, based on a color temperature value, a white balance gain coefficient corresponding to the color temperature value in the following manner. The processing module may substitute the color temperature value into a lookup table, to find the white balance gain coefficient corresponding to the color temperature value. It should be noted that a response of a sensor of a camera to white and gray under light sources of various color temperatures is already recorded in a white balance calibration phase. In a software running period, a currently calculated color temperature value is compared with a lookup table, and nearest adjacent calibration color temperature points are selected. A white balance gain coefficient corresponding to a color temperature value may be determined by using interpolation of the two points. In this manner, the first white balance gain coefficient corresponding to the first region may be determined based on the color temperature value of the first region, and the second white balance gain coefficient corresponding to the second region may be determined based on the color temperature value of the second region; or the third white balance gain coefficient corresponding to the image may be determined based on the color temperature value of the image.

In an embodiment, when the difference between the color temperature value of the first region and the color temperature value of the second region is greater than the preset threshold, the processing module may perform white balance correction on the image based on the first white balance gain coefficient and the second white balance gain coefficient in the following manner. The processing module performs white balance correction on the image B (equivalent to the first region) based on the first white balance gain coefficient, and performs white balance correction on the image A (equivalent to the second region) based on the second white balance gain coefficient. Then, the processing module adds values of pixels that are in the two images and that have a same pixel location, to obtain new pixels. These new pixels form a complete image after white balance correction.

For example, the first white balance gain coefficient is $r_{gain(1)}$, $g_{gain(1)}$, and $b_{gain(1)}$, where $r_{gain(1)}$ is used to adjust a value of a red (R) component of a pixel in the image, $g_{gain(1)}$ is used to adjust a value of a green (G) component of a pixel in the image, and $b_{gain(1)}$ is used to adjust a value of a blue (B) component of a pixel in the image. For an adjustment process, refer to Formula 1-1.

$$\begin{cases} r_{(1)} = r_{(B)} * r_{gain(1)} \\ g_{(1)} = g_{(B)} * g_{gain(1)} \\ b_{(1)} = b_{(B)} * b_{gain(1)} \end{cases} \quad \text{Formula 1-1}$$

($r_{(B)}$, $g_{(B)}$, $b_{(B)}$) is an RGB value of a pixel in the image B, and ($r_{(1)}$, $g_{(1)}$, $b_{(1)}$) is an RGB value of the pixel after adjustment.

The second white balance gain coefficient is $r_{gain(2)}$, $g_{gain(2)}$, and $b_{gain(2)}$, where $r_{gain(2)}$ is used to adjust a value of a red component of a pixel in the image, $g_{gain(2)}$ is used to adjust a value of a green component of a pixel in the image, and $b_{gain(2)}$ is used to adjust a value of a blue component of a pixel in the image. For an adjustment process, refer to Formula 1-2.

$$\begin{cases} r_{(2)} = r_{(A)} * r_{gain(2)} \\ g_{(2)} = g_{(A)} * g_{gain(2)} \\ b_{(2)} = b_{(A)} * b_{gain(2)} \end{cases} \quad \text{Formula 1-2}$$

$(r_{(B)}, g_{(B)}, b_{(B)})$ is an RGB value of a pixel in the image A, and $(r_{(1)}, g_{(1)}, b_{(1)})$ is an RGB value of the pixel after adjustment.

If the complete image after the white balance correction is an image C, there is a relationship, between an RGB value of a pixel in the image C, an RGB value of a pixel in the image A, and an RGB value of a pixel in the image B, shown in Formula 1-3.

Formula 1-3

$$RGB_{ij(C)} = RGB_{ij(A)} + RGB_{ij(B)}$$

$RGB_{ij(C)}$ is an RGB value of a pixel at a location coordinate (i, j) in the image C, $RGB_{ij(A)}$ is an RGB value of a pixel at a location coordinate (i, j) in the image A, and $RGB_{ij(B)}$ is an RGB value of a pixel at a location coordinate (i, j) in the image B.

In an embodiment, when the difference between the color temperature value of the first region and the color temperature value of the second region is not greater than the preset threshold, the processing module may determine the color temperature value of the image based on the color temperature value of the first region and the color temperature value of the second region in the following manner. The processing module determines a first weight based on an area proportion of the first region in the image, and determines a second weight based on an area proportion of the second region in the image; and determines the color temperature value of the image based on the color temperature value of the first region, the color temperature value of the second region, the first weight, and the second weight.

For example, the first weight may be equal to the area proportion of the first region in the image, and the second weight may be equal to the area proportion of the second region in the image. In another example, optional values of the first weight and the second weight may be preset values, for example, may be 70% and 30%. If the area proportion of the first region in the image is greater than the area proportion of the second region in the image, the first weight is greater than the second weight. In other words, the first weight is 70%, and the second weight is 30%. There may be another manner of determining a weight based on an area proportion of a region. Details are not described herein one by one.

For example, if the first weight is 60%, the second weight is 40%, the color temperature value of the first region is 7000 k, and the color temperature value of the second region is 6000 k, the color temperature value of the image is: 7000*0.6+6000*0.4=6600 (k).

In still another example, for a method for calculating the color temperature value of the image, refer to Formula 1-4.

Formula 1-4

$$CT = (CT_1 * S_1 + CT_2 * S_2)/(width * height)$$

CT is the color temperature value of the image, $CT_1$ is the color temperature value of the first region, $CT_2$ is the color temperature value of the second region, $S_1$ is an area of the first region, $S_2$ is an area of the second region, width is a width of the image, and height is a height of the image.

In a subsequent process, the processing module determines the third white balance gain coefficient corresponding to the color temperature value of the image. It should be noted that for this determining process, reference may be made to the descriptions in the foregoing content. Details are not described herein again. Then, the processing module performs white balance correction on the image based on the third white balance gain coefficient. For a process of performing white balance correction on the image based on the white balance gain coefficient, refer to the descriptions in the content of the embodiment corresponding to Formula 1-1 or Formula 1-2. Details are not described herein again.

In another possible implementation, the processing module may perform white balance correction on the image based on the color temperature value of the first region and the color temperature value of the second region in the following manners. The processing module determines, based on the color temperature value of the first region, a first white balance gain coefficient corresponding to the first region, and determines, based on the color temperature value of the second region, a second white balance gain coefficient corresponding to the second region. If a difference between the color temperature value of the first region and the color temperature value of the second region is greater than a preset threshold, the processing module performs white balance correction on the image based on the first white balance gain coefficient and the second white balance gain coefficient; or if a difference between the color temperature value of the first region and the color temperature value of the second region is not greater than a preset threshold, the processing module determines a fourth white balance gain coefficient based on the first white balance gain coefficient and the second white balance gain coefficient; and performs white balance correction on the image based on the fourth white balance gain coefficient.

For a manner in which the processing module determines, based on a color temperature value, a white balance gain coefficient corresponding to the color temperature value, and a manner in which the processing module performs correction on the image based on the white balance gain coefficient, refer to the foregoing descriptions. Details are not described herein again. It may be understood that, in this implementation, when the difference between the color temperature value of the first region and the color temperature value of the second region is greater than the preset threshold, the processing module performs white balance correction on the first region in the image based on the first white balance gain coefficient corresponding to the first region, and performs white balance correction on the second region in the image based on the second white balance gain coefficient corresponding to the second region (for a particular implementation, refer to the descriptions in the foregoing content). When the difference between the color temperature value of the first region and the color temperature value of the second region is not greater than the preset threshold, the processing module determines the new fourth white balance gain coefficient based on the first white balance gain coefficient and the second white balance gain coefficient, and then performs white balance correction on the image based on the fourth white balance gain coefficient.

In an embodiment, the processing module may determine the fourth white balance gain coefficient based on the first white balance gain coefficient and the second white balance gain coefficient in the following manner. The processing module determines a first weight based on an area proportion of the first region in the image, determines a second weight based on an area proportion of the second region in the image, and determines the fourth white balance gain coefficient based on the first white balance gain coefficient, the second white balance gain coefficient, the first weight, and the second weight.

For example, the first weight may be equal to the area proportion of the first region in the image, and the second weight may be equal to the area proportion of the second region in the image. In another example, optional values of the first weight and the second weight may be preset values, for example, may be 70% and 30%. If the area proportion of the first region in the image is greater than the area proportion of the second region in the image, the first weight is greater than the second weight. In other words, the first weight is 70%, and the second weight is 30%. There may be another manner of determining a weight based on an area proportion of a region. Details are not described herein one by one.

For example, if the first weight is 60%, the second weight is 40%, the first white balance gain coefficient is $K_1$ (actually including gain coefficients corresponding to three color components), and the second white balance gain coefficient is $K_2$ (actually including gain coefficients corresponding to three color components), the fourth white balance gain coefficient is: $K_1*0.6+K_2*0.4$.

In the method embodiment shown in FIG. 2, when the image including the detection object is obtained, the processing module performs region division on the image based on the detection object to obtain image regions, and the obtained image regions include the first region and the second region. Because the color temperature value of the first region is different from the color temperature value of the second region, white balance correction is performed on the image based on the color temperature values of the two regions, so that the white balance correction can be better performed on the image, and a display effect of the image can be improved.

The following describes some possible solutions extended based on the method embodiment shown in FIG. 2.

Figure 9:
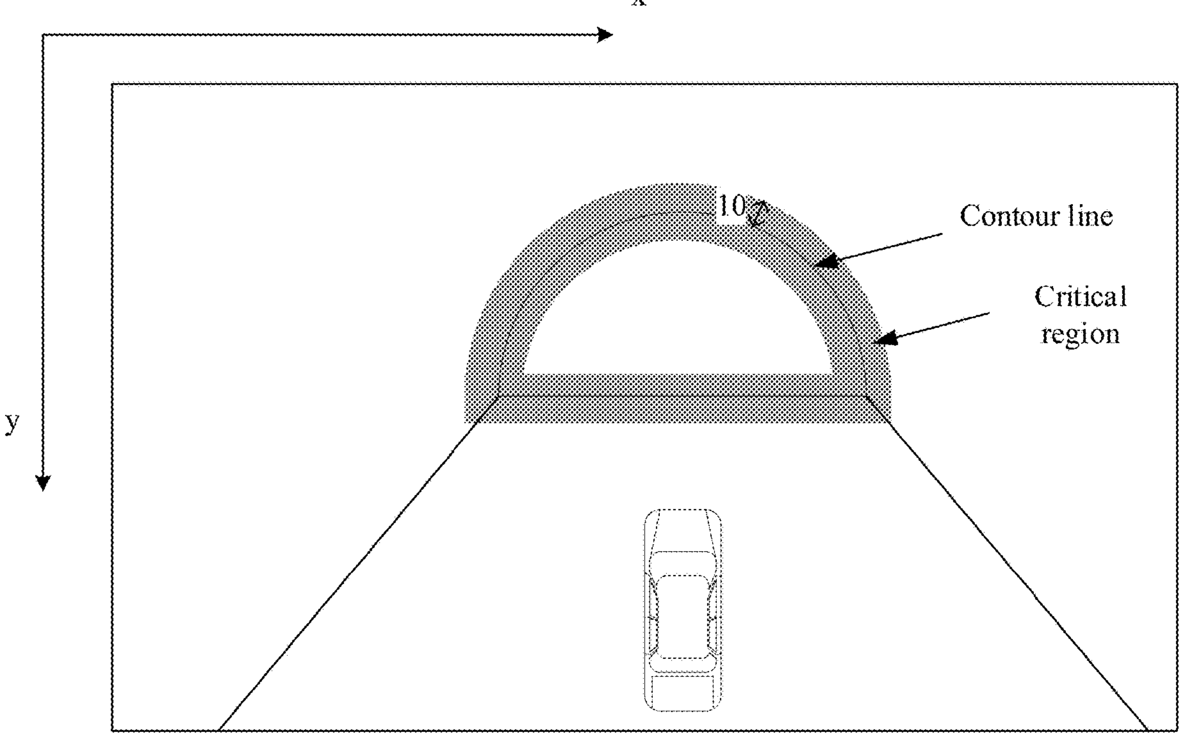
FIG. 9 is a schematic diagram of a critical region according to an embodiment of this application.

In some possible implementations, the image region obtained by the processing module by performing region division further includes a critical region, and the critical region includes the contour line of the detection object. For example, the critical region may be an image region formed by pixels within a distance range of 10 pixels to the left and 10 pixels to the right of the contour line. It should be noted that the 10 pixels herein are merely examples, and there may be another value. FIG. 9 is a schematic diagram of the critical region according to an embodiment of this application. It may be understood that the critical region includes a partial image region of the first region and a partial image region of the second region.

In an embodiment, the processing module may perform white balance correction on the image based on the color temperature value of the first region and the color temperature value of the second region in the following manners. If the difference between the color temperature value of the first region and the color temperature value of the second region is greater than the preset threshold, the processing module determines, based on the color temperature value of the first region, the first white balance gain coefficient corresponding to the first region, and determines, based on the color temperature value of the second region, the second white balance gain coefficient corresponding to the second region; determines a fifth white balance gain coefficient based on the first white balance gain coefficient and the second white balance gain coefficient, where the fifth white balance gain coefficient is used to correct the critical region; and performs white balance correction on the image based on the first white balance gain coefficient, the second white balance gain coefficient, and the fifth white balance gain coefficient.

In some implementations, the processing module may perform white balance correction on the first region in the image based on the first white balance gain coefficient corresponding to the first region, and perform white balance correction on the second region in the image based on the second white balance gain coefficient corresponding to the second region (for a particular implementation, refer to the descriptions in the foregoing content), to obtain a preliminarily processed image (for example, refer to the image C described in the foregoing content). Then, the processing module performs white balance correction on the critical region in the image C based on the fifth white balance gain coefficient, to obtain a final white balance-corrected image. In this manner, for a transition region, namely, the critical region, between the first region and the second region, the new fifth white balance gain coefficient is used for processing, so that transition between the first region and the second region is smoother, and the display effect of the image is further improved.

It should be noted that for a manner in which the processing module determines the fifth white balance gain coefficient based on the first white balance gain coefficient and the second white balance gain coefficient, refer to the manner in which the processing module determines the fourth white balance gain coefficient based on the first white balance gain coefficient and the second white balance gain coefficient that is described in the foregoing content. Details are not described herein again.

Figure 10:
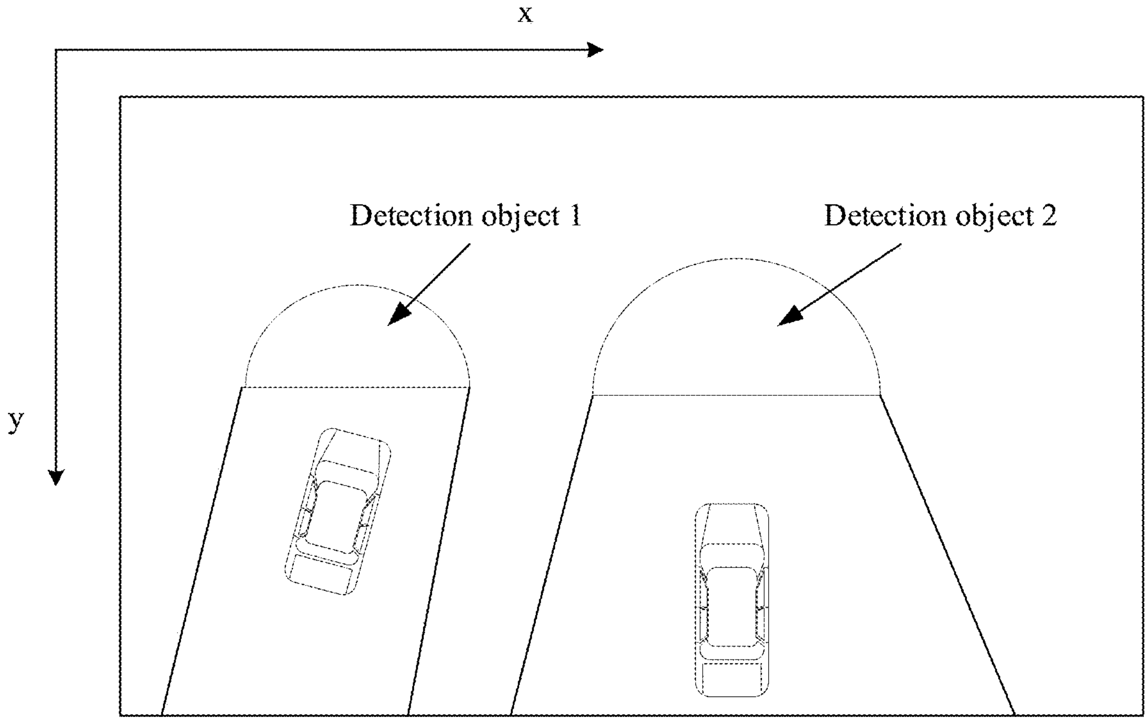
FIG. 10 is a schematic diagram of an image according to an embodiment of this application.

In other possible implementations, the image obtained by the processing module may include a plurality of detection objects. For example, FIG. 10 is a schematic diagram of an image according to an embodiment of this application. In FIG. 10, the image includes two detection objects, for example, a detection object 1 and a detection object 2.

Figure 11:
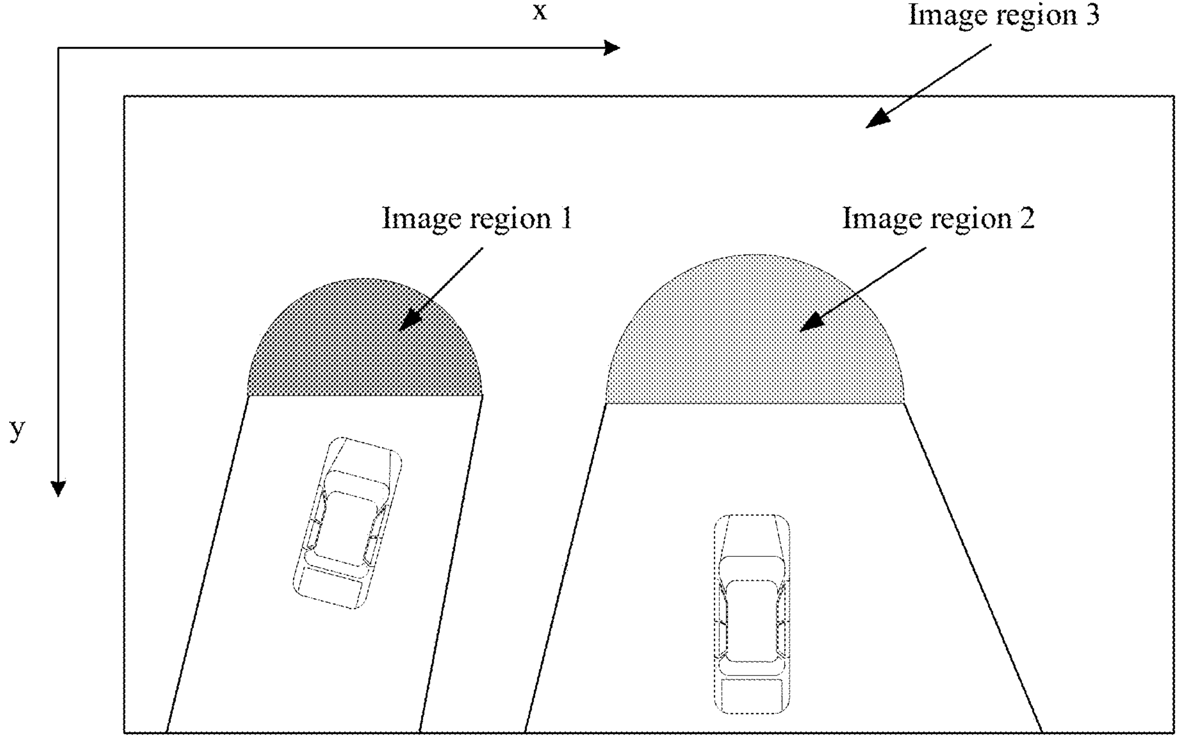
FIG. 11 is a schematic diagram of a region division manner according to an embodiment of this application.

In an implementation, the processing module may perform region division on the image based on the detection objects in the following manner. The image is divided into a plurality of image regions based on different detection objects. Except an image region that does not include the detection objects, all other image regions include one detection object. For example, FIG. 11 is a schematic diagram of another region division manner according to an embodiment of this application. An image region 1 and an image region 2 each include one detection object, and an image region 3 does not include the detection objects.

In this manner, in the operation of comparing color temperature values of divided regions, each image region that includes a detection object is compared with the image region that does not include the detection objects. For example, the image region 1 is compared with the image region 3, and the image region 2 is compared with the image region 3. If both a difference between a color temperature value of the image region 1 and a color temperature value of the image region 3 and a difference between a color temperature value of the image region 2 and a color temperature value of the image region 3 are greater than a preset threshold, the processing module may perform white balance correction on the image region 1 based on a white balance gain coefficient corresponding to the image region 1, perform white balance correction on the image region 2 based on a white balance gain coefficient corresponding to the image region 2, and perform white balance correction on the image region 3 based on a white balance gain coefficient corresponding to the image region 3, to finally obtain a white balance-processed image.

If a difference between color temperature values of two image regions is not greater than the preset threshold, the two image regions may be considered as an entire image region for processing. For example, if the difference between the color temperature value of the image region 1 and the color temperature value of the image region 3 is not greater than the preset threshold, and the difference between the color temperature value of the image region 2 and the color temperature value of the image region 3 is greater than the preset threshold, the image region 1 and the image region 3 are considered as an entire image region (referred to as an image region 4 for case of description) for processing. In an embodiment, a color temperature value of the image region 4 may be obtained based on the color temperature value of the image region 1 and the color temperature value of the image region 3. For example, the processing module may determine a color temperature value of the image based on the color temperature value of the image region 1 and the color temperature value of the image region 3 in the following manner. The processing module determines a third weight based on an area proportion of the image region 1 in the image region 4, determines a fourth weight based on an area proportion of the image region 3 in the image region 4, and determines the color temperature value of the image based on the color temperature value of the image region 1, the color temperature value of the image region 3, the third weight, and the fourth weight.

For example, the third weight may be equal to the area proportion of the image region 1 in the image region 4, and the fourth weight may be equal to the area proportion of the image region 3 in the image region 4. In another example, optional values of the third weight and the fourth weight may be preset values, for example, may be 60% and 40%. If the area proportion of the image region 3 in the image region 4 is greater than the area proportion of the image region 1 in the image region 4, the fourth weight is greater than the third weight. In other words, the third weight is 40%, and the fourth weight is 60%. There may be another manner of determining a weight based on an area proportion of an image region. Details are not described herein one by one.

For example, if the third weight is 20%, the fourth weight is 80%, the color temperature value of the image region 1 is 6000 k, and the color temperature value of the image region 3 is 6500 k, the color temperature value of the image region 4 is: 6000*0.2+6500*0.8=6400 (k).

In still another example, for a method for calculating the color temperature value of the image region 4, refer to Formula 1-5.

$$CT = (CT_1*S_1 + CT_2*S_2)/(S_1 + S_2) \quad \text{Formula 1-5}$$

CT is the color temperature value of the image region 4, $CT_1$ is the color temperature value of the image region 1, $CT_2$ is the color temperature value of the image region 3, $S_1$ is an area of the image region 1, and $S_2$ is an area of the image region 3.

Then, white balance correction is performed on the image based on the color temperature value of the image region 2 and the color temperature value of the image region 4. In other words, the processing module may perform white balance correction on the image region 2 based on the white balance gain coefficient corresponding to the image region 2, and perform white balance correction on the image region 4 based on the white balance gain coefficient corresponding to the image region 4, to finally obtain a white balance-processed image.

In an embodiment, in another possible manner, the processing module may consider a plurality of image regions that include the detection objects as a first region, and consider the image region that does not include the detection objects as a second region. FIG. 11 is used as an example. The image region 1 and the image region 2 are considered as the first region, and the image region 3 is considered as the second region. In an embodiment, a color temperature value of the first region may be obtained based on the color temperature value of the image region 1 and the color temperature value of the image region 2. Then, the processing module performs white balance correction on the image based on the color temperature value of the first region and a color temperature value of the second region.

Figure 12:
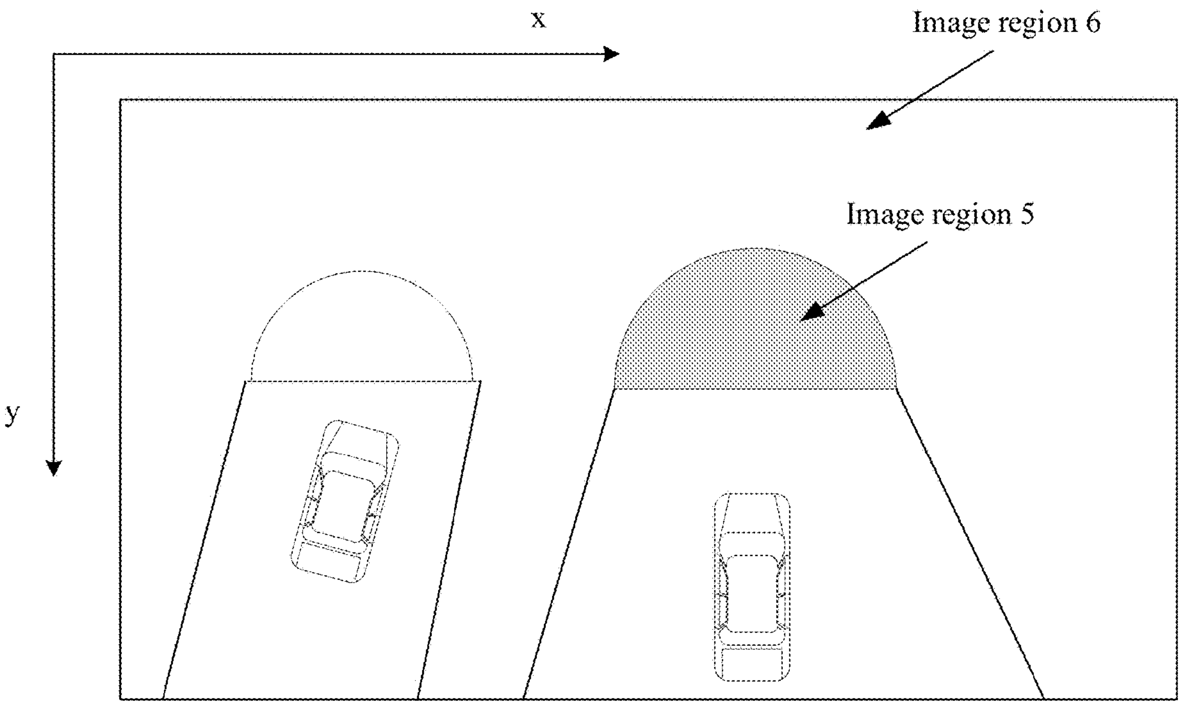
FIG. 12 is a schematic diagram of another region division manner according to an embodiment of this application.

In still another implementation, the processing module may perform region division on the image based on the detection objects in the following manner. The processing module uses a detection object with a largest area in the plurality of detection objects as a detection object that is finally used for region division. With reference to the case shown in FIG. 10, an area of the detection object 1 is greater than an area of the detection object 2. In this case, the processing module performs region division on the image based on the detection object 1. FIG. 12 is a schematic diagram of another region division manner according to an embodiment of this application. An image region 5 includes the detection object 1, and an image region 6 does not include the detection object 1. In this manner, the image region 5 may be considered as the first region described in the foregoing embodiment, and the image region 6 may be considered as the second region described in the foregoing embodiment. The processing module performs white balance correction on the image based on a color temperature value of the first region and a color temperature value of the second region.

To implement functions in the method provided in the foregoing embodiments of this application, the processing module may include a hardware structure and a software module, to implement the functions in a form of the hardware structure, the software module, or a combination of the hardware structure and the software module. One of the foregoing functions may be performed by using the hardware structure, the software module, or the combination of the hardware structure and the software module.

Figure 13:
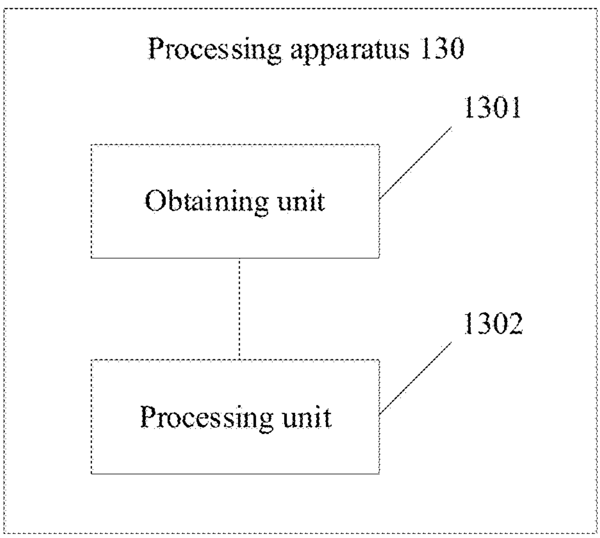
FIG. 13 is a schematic diagram of a processing apparatus according to an embodiment of this application.

FIG. 13 is a schematic diagram of a structure of a processing apparatus according to an embodiment of this application. The processing apparatus 130 may be an apparatus in a mobile station. The processing apparatus 130 includes an obtaining unit 1301 and a processing unit 1302. The following further describes the two units.

The obtaining unit 1301 is configured to obtain an image, where the image includes a detection object. For an operation performed by the obtaining unit 1301, refer to the descriptions of the content of operation S101 in FIG. 2.

The processing unit 1302 is configured to perform region division on the image based on the detection object to obtain image regions, where obtained image regions include a first region and a second region, the first region includes the detection object, and the second region does not include the detection object. For an operation performed by the processing unit 1302, refer to the descriptions of the content of operation S102 in FIG. 2.

The processing unit 1302 is further configured to perform white balance correction on the image based on a color temperature value of the first region and a color temperature value of the second region. For an operation performed by the processing unit 1302, refer to the descriptions of the content of operation S103 in FIG. 2.

In a possible implementation, the processing unit 1302 is configured to: if a difference between the color temperature value of the first region and the color temperature value of the second region is greater than a preset threshold, determine, based on the color temperature value of the first region, a first white balance gain coefficient corresponding to the first region, and determine, based on the color temperature value of the second region, a second white balance gain coefficient corresponding to the second region; and perform white balance correction on the image based on the first white balance gain coefficient and the second white balance gain coefficient.

In a possible implementation, the processing unit 1302 is further configured to: if the difference between the color temperature value of the first region and the color temperature value of the second region is not greater than the preset threshold, determine a color temperature value of the image based on the color temperature value of the first region and the color temperature value of the second region; determine a third white balance gain coefficient corresponding to the color temperature value of the image; and perform white balance correction on the image based on the third white balance gain coefficient.

In a possible implementation, the processing unit 1302 is configured to: determine a first weight based on an area proportion of the first region in the image, and determine a second weight based on an area proportion of the second region in the image; and determine the color temperature value of the image based on the color temperature value of the first region, the color temperature value of the second region, the first weight, and the second weight.

In a possible implementation, the processing unit 1302 is configured to: determine, based on the color temperature value of the first region, a first white balance gain coefficient corresponding to the first region, and determine, based on the color temperature value of the second region, a second white balance gain coefficient corresponding to the second region; and if a difference between the color temperature value of the first region and the color temperature value of the second region is greater than a preset threshold, perform white balance correction on the image based on the first white balance gain coefficient and the second white balance gain coefficient; or if a difference between the color temperature value of the first region and the color temperature value of the second region is not greater than a preset threshold, determine a fourth white balance gain coefficient based on the first white balance gain coefficient and the second white balance gain coefficient; and perform white balance correction on the image based on the fourth white balance gain coefficient.

In a possible implementation, the processing unit 1302 is configured to: determine a first weight based on an area proportion of the first region in the image, and determine a second weight based on an area proportion of the second region in the image; and determine the fourth white balance gain coefficient based on the first white balance gain coefficient, the second white balance gain coefficient, the first weight, and the second weight.

In a possible implementation, the processing unit 1302 is configured to perform region division on the image based on a contour line of the detection object.

In a possible implementation, the obtained image region further includes a critical region, and the critical region includes the contour line; and the processing unit 1302 is configured to: if the difference between the color temperature value of the first region and the color temperature value of the second region is greater than the preset threshold, determine, based on the color temperature value of the first region, the first white balance gain coefficient corresponding to the first region, and determine, based on the color temperature value of the second region, the second white balance gain coefficient corresponding to the second region; determine a fifth white balance gain coefficient based on the first white balance gain coefficient and the second white balance gain coefficient, where the fifth white balance gain coefficient is used to correct the critical region; and perform white balance correction on the image based on the first white balance gain coefficient, the second white balance gain coefficient, and the fifth white balance gain coefficient.

In a possible implementation, the processing unit 1302 is configured to: generate a first bounding box of the detection object; determine, in an image region included in a second bounding box, a region contour line that includes a largest image area as the contour line of the detection object, where the second bounding box is obtained by extending the first bounding box outwards; and perform region division on the image based on the contour line of the detection object, where the first region is an image region included in the contour line, and the second region is an image region outside the contour line.

In one embodiment, the processing apparatus further includes a determining unit. The determining unit is configured to determine that a current location is close to a preset location.

In one embodiment, for operations performed by the units of the processing apparatus shown in FIG. 13, refer to related content of the processing module in the method embodiment corresponding to FIG. 2. Details are not described herein again. The foregoing units may be implemented by hardware, software, or a combination of software and hardware. In an embodiment, the functions of the obtaining unit 1301 and the processing unit 1302 in the foregoing content may be implemented by one or more processors in the processing apparatus 130.

Figure 14:
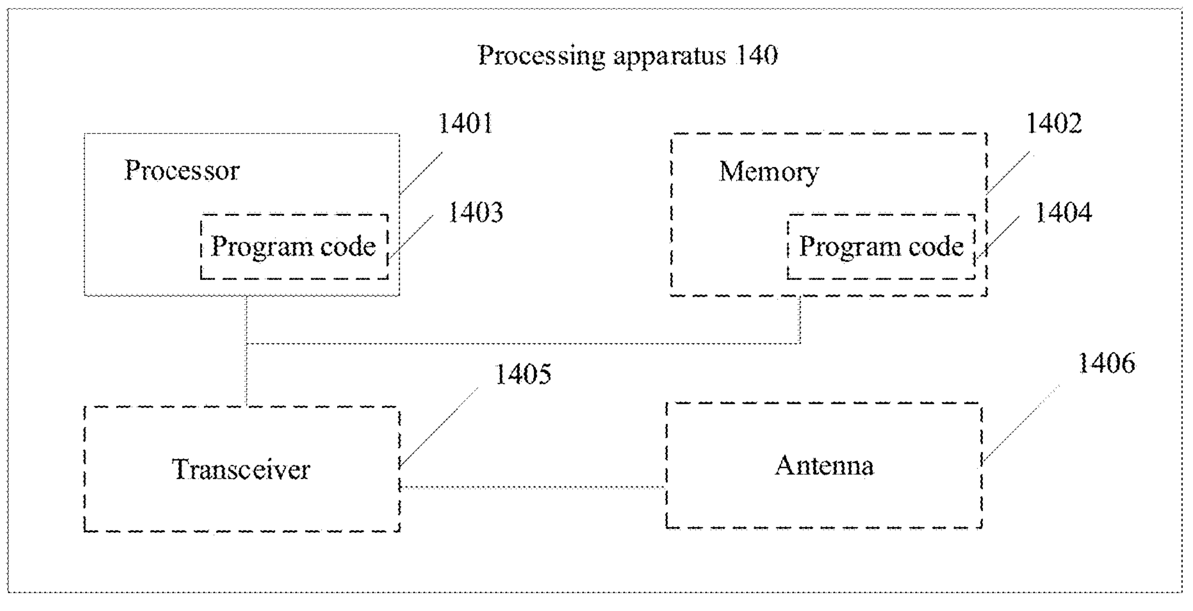
FIG. 14 is a schematic diagram of a processing apparatus according to an embodiment of this application.

FIG. 14 is a schematic diagram of a structure of another processing apparatus according to an embodiment of this application. The processing apparatus 140 may be configured to implement the method described in the foregoing method embodiment. For details, refer to the descriptions in the foregoing method embodiment.

The processing apparatus 140 may include one or more processors 1401. The processor 1401 may be a general-purpose processor, a dedicated processor, or the like. The processor 1401 may be configured to: control the processing apparatus, execute a software program, and process data of the software program.

In an embodiment, the processing apparatus 140 may include one or more memories 1402. Program code 1404 may be stored in the memory 1402. The program code may be run on the processor 1401, so that the processing apparatus 140 performs the method described in the foregoing method embodiment. In an embodiment, the memory 1402 may further store data. The processor 1401 and the memory 1402 may be separately disposed, or may be integrated together.

In an embodiment, the processing apparatus 140 may further include a transceiver 1405 and an antenna 1406. The transceiver 1405 may be referred to as a transceiver unit, a transceiver machine, a transceiver circuit, or the like, and is configured to implement a transceiver function. The transceiver 1405 may include a receiver and a transmitter. The receiver may be referred to as a receiver machine, a receiving circuit, or the like, and is configured to implement a receiving function. The transmitter may be referred to as a transmitter machine, a transmitting circuit, or the like, and is configured to implement a sending function.

The processor 1401 is configured to obtain an image through the transceiver 1405, where the image includes a detection object; and is further configured to: perform region division on the image based on the detection object to obtain image regions, where the obtained image regions include a first region and a second region, the first region includes the detection object, and the second region does not include the detection object; and perform white balance correction on the image based on a color temperature value of the first region and a color temperature value of the second region.

It should be noted that, in the foregoing embodiment, the processing apparatus 140 may be an apparatus in a mobile station, or may be a chip, a chip system, a processor, or the like that supports the apparatus in the mobile station to implement the foregoing method.

In one embodiment, for an operation performed by the processing apparatus 140, refer to related content of the processing module in the method embodiment corresponding to FIG. 2. Details are not described herein again.

In one embodiment, the transceiver 1405 may be a transceiver circuit, an interface, or an interface circuit. A transceiver circuit, an interface, or an interface circuit configured to implement receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In one embodiment, the processor 1401 may store program code 1403, and the program code 1403 is run on the processor 1401, so that the processing apparatus 140 performs the method described in the foregoing method embodiment. The program code 1403 may be solidified in the processor 1401. In this case, the processor 1401 may be implemented by hardware.

In one embodiment, the processing apparatus 140 may include a circuit. The circuit may implement the sending, receiving, or communication function in the foregoing method embodiment.

The processor and the transceiver that are described in this application may be implemented on an integrated circuit (IC), an analog IC, a radio frequency integrated circuit RFIC, a mixed-signal IC, an application-specific integrated circuit (ASIC), a printed circuit board (PCB), an electronic device, or the like.

The processing apparatus in the foregoing embodiment may be a network device or a terminal device. However, a scope of the processing apparatus described in this application is not limited thereto, and a structure of the processing apparatus may not be limited by that in FIG. 14. The processing apparatus may be an independent device or may be a part of a larger device. For example, the processing apparatus may be:

(1) an independent integrated circuit IC, a chip, or a chip system or a subsystem;

(2) a set of one or more ICs, where, in an embodiment, the IC set may also include a storage component configured to store data and program code;

(3) an ASIC, such as a modem;

(4) a module that can be embedded in another device; and (5) a receiver machine, an intelligent terminal, a wireless device, a handheld device, a mobile unit, a vehicle-mounted device, a cloud device, an artificial intelligence device, and the like.

Figure 15:
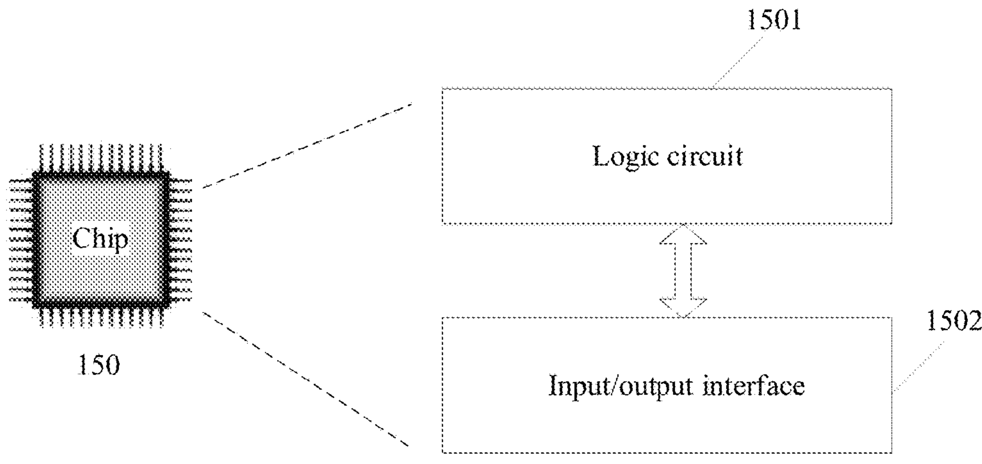
FIG. 15 is a schematic diagram of a structure of a chip according to an embodiment of this application.

For a communication apparatus that may be a chip or a chip system, refer to a schematic diagram of a structure of a chip shown in FIG. 15. The chip 150 shown in FIG. 15 includes a logic circuit 1501 and an input/output interface 1502. There may be one or more logic circuits 1501, and there may be a plurality of input/output interfaces 1502.

The logic circuit 1501 may be configured to obtain an image through the input/output interface 1502, where the image includes a detection object.

The logic circuit 1501 may be further configured to: perform region division on the image based on the detection object to obtain image regions, where the obtained image regions include a first region and a second region, the first region includes the detection object, and the second region does not include the detection object; and perform white balance correction on the image based on a color temperature value of the first region and a color temperature value of the second region.

In one embodiment, in this case, for an operation performed by the logic circuit 1501, refer to related content of the calibration module in the method embodiment corresponding to FIG. 2. Details are not described herein again.

A person skilled in the art may further understand that various illustrative logical blocks and operations that are listed in embodiments of this application may be implemented by using electronic hardware, computer software, or a combination thereof. Whether the functions are implemented by hardware or software depends on particular applications and a design requirement of the entire system. A person skilled in the art may use various methods to implement the described functions for each particular application, but it should not be considered that the implementation goes beyond the scope of embodiments of this application.

This application further provides a computer-readable storage medium storing a computer program. When the computer-readable storage medium is executed by a computer, the function in any one of the foregoing method embodiments is implemented.

This application further provides a computer program product. When the computer program product is executed by a computer, the function of any one of the foregoing method embodiments is implemented.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer instructions are loaded and executed on a computer, the procedure or functions according to embodiments of this application are all or partially generated. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may understand that various numerals such as "first" and "second" in this application are merely used for differentiation for ease of description, and are not used to limit the scope or a sequence of embodiments of this application.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that the units and algorithm operations in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

What is claimed is:

1. An image processing method, comprising:

obtaining an image, wherein the image comprises a detection object;

determining, based on a detected environment of a mobile station, whether the image is affected by light sources of at least two different color temperatures;

in response to determining that the image is affected by light sources of at least two different color temperatures, performing region division on the image based on the detection object to obtain image regions, wherein the obtained image regions comprise a first region and a second region, the first region comprises the detection object, and the second region does not comprise the detection object; and performing white balance correction on the image based on a color temperature value of the first region and a color temperature value of the second region.

2. The method according to claim 1, wherein the performing the white balance correction on the image based on a color temperature value of the first region and a color temperature value of the second region comprises:

if a difference between the color temperature value of the first region and the color temperature value of the second region is greater than a preset threshold, determining, based on the color temperature value of the first region, a first white balance gain coefficient corresponding to the first region, and determining, based on the color temperature value of the second region, a second white balance gain coefficient corresponding to the second region; and performing the white balance correction on the image based on the first white balance gain coefficient and the second white balance gain coefficient.

3. The method according to claim 2, wherein the method further comprises:

if the difference between the color temperature value of the first region and the color temperature value of the second region is not greater than the preset threshold, determining a color temperature value of the image based on the color temperature value of the first region and the color temperature value of the second region;

determining a third white balance gain coefficient corresponding to the color temperature value of the image; and performing the white balance correction on the image based on the third white balance gain coefficient.

4. The method according to claim 3, wherein the determining a color temperature value of the image based on the color temperature value of the first region and the color temperature value of the second region comprises:

determining a first weight based on an area proportion of the first region in the image, and determining a second weight based on an area proportion of the second region in the image; and determining the color temperature value of the image based on the color temperature value of the first region, the color temperature value of the second region, the first weight, and the second weight.

5. The method according to claim 1, wherein the performing white balance correction on the image based on a color temperature value of the first region and a color temperature value of the second region comprises:

determining, based on the color temperature value of the first region, a first white balance gain coefficient corresponding to the first region, and determining, based on the color temperature value of the second region, a second white balance gain coefficient corresponding to the second region; and if a difference between the color temperature value of the first region and the color temperature value of the second region is greater than a preset threshold, performing the white balance correction on the image based on the first white balance gain coefficient and the second white balance gain coefficient; or if a difference between the color temperature value of the first region and the color temperature value of the second region is not greater than a preset threshold, determining a fourth white balance gain coefficient based on the first white balance gain coefficient and the second white balance gain coefficient; and performing the white balance correction on the image based on the fourth white balance gain coefficient.

6. The method according to claim 5, wherein the determining the fourth white balance gain coefficient based on the first white balance gain coefficient and the second white balance gain coefficient comprises:

determining a first weight based on an area proportion of the first region in the image, and determining a second weight based on an area proportion of the second region in the image; and determining the fourth white balance gain coefficient based on the first white balance gain coefficient, the second white balance gain coefficient, the first weight, and the second weight.

7. The method according to claim 1, wherein the performing the region division on the image based on the detection object comprises:

performing the region division on the image based on a contour line of the detection object.

8. The method according to claim 7, wherein the obtained image regions further comprise a critical region, and the critical region comprises the contour line; and the performing white balance correction on the image based on a color temperature value of the first region and a color temperature value of the second region comprises:

if a difference between the color temperature value of the first region and the color temperature value of the second region is greater than a preset threshold, determining, based on the color temperature value of the first region, a first white balance gain coefficient corresponding to the first region, and determining, based on the color temperature value of the second region, a second white balance gain coefficient corresponding to the second region;

determining a fifth white balance gain coefficient based on the first white balance gain coefficient and the second white balance gain coefficient, wherein the fifth white balance gain coefficient is used to correct the critical region; and performing the white balance correction on the image based on the first white balance gain coefficient, the second white balance gain coefficient, and the fifth white balance gain coefficient.

9. The method according to claim 7, wherein the performing the region division on the image based on the contour line of the detection object comprises:

generating a first bounding box of the detection object;

determining, in an image region comprised in a second bounding box, a region contour line that comprises a largest image area as the contour line of the detection object, wherein the second bounding box is obtained by extending the first bounding box outwards; and performing the region division on the image based on the contour line of the detection object, wherein the first region is an image region comprised in the contour line, and the second region is an image region outside the contour line.

10. The method according to claim 1, wherein before the performing the region division on the image based on the detection object, the method comprises:

determining that a current location is close to a preset location.

11. A image processing apparatus, comprising:

a memory configured to store program code; and a processor configured to invoke the program code in the memory to cause the imaging processing apparatus to:

obtain an image, wherein the image comprises a detection object;

determine, based on a detected environment of a mobile station, whether the image is affected by light sources of at least two different color temperatures;

in response to determining that the image is affected by light sources of at least two different color temperatures, perform region division on the image based on the detection object to obtain image regions, wherein the obtained image regions comprise a first region and a second region, the first region comprises the detection object, and the second region does not comprise the detection object; and perform white balance correction on the image based on a color temperature value of the first region and a color temperature value of the second region.

12. The apparatus according to claim 11, wherein to perform white balance correction on the image based on a color temperature value of the first region and a color temperature value of the second region, the image processing apparatus is further to:

if a difference between the color temperature value of the first region and the color temperature value of the second region is greater than a preset threshold, determine, based on the color temperature value of the first region, a first white balance gain coefficient corresponding to the first region, and determine, based on the color temperature value of the second region, a second white balance gain coefficient corresponding to the second region; and perform the white balance correction on the image based on the first white balance gain coefficient and the second white balance gain coefficient.

13. The apparatus according to claim 12, wherein the image processing apparatus is further to:

if the difference between the color temperature value of the first region and the color temperature value of the second region is not greater than the preset threshold, determine a color temperature value of the image based on the color temperature value of the first region and the color temperature value of the second region;

determine a third white balance gain coefficient corresponding to the color temperature value of the image; and perform the white balance correction on the image based on the third white balance gain coefficient.

14. The apparatus according to claim 13, wherein the determining a color temperature value of the image based on the color temperature value of the first region and the color temperature value of the second region, the image processing apparatus is further to:

determine a first weight based on an area proportion of the first region in the image, and determining a second weight based on an area proportion of the second region in the image; and determine the color temperature value of the image based on the color temperature value of the first region, the color temperature value of the second region, the first weight, and the second weight.

15. The apparatus according to claim 11, wherein the performing white balance correction on the image based on a color temperature value of the first region and a color temperature value of the second region, the image processing apparatus is further to:

determine, based on the color temperature value of the first region, a first white balance gain coefficient corresponding to the first region, and determining, based on the color temperature value of the second region, a second white balance gain coefficient corresponding to the second region; and if a difference between the color temperature value of the first region and the color temperature value of the second region is greater than a preset threshold, perform the white balance correction on the image based on the first white balance gain coefficient and the second white balance gain coefficient; or if a difference between the color temperature value of the first region and the color temperature value of the second region is not greater than a preset threshold, determine a fourth white balance gain coefficient based on the first white balance gain coefficient and the second white balance gain coefficient; and performing the white balance correction on the image based on the fourth white balance gain coefficient.

16. The apparatus according to claim 15, wherein the determining the fourth white balance gain coefficient based on the first white balance gain coefficient and the second white balance gain coefficient-, the image processing apparatus is further to:

determine a first weight based on an area proportion of the first region in the image, and determining a second weight based on an area proportion of the second region in the image; and determine the fourth white balance gain coefficient based on the first white balance gain coefficient, the second white balance gain coefficient, the first weight, and the second weight.

17. The apparatus according to claim 11, wherein the performing the region division on the image based on the detection object-, the image processing apparatus is further to:

perform the region division on the image based on a contour line of the detection object.

18. The apparatus according to claim 17, wherein the obtained image regions further comprise a critical region, and the critical region comprises the contour line; and to perform white balance correction on the image based on a color temperature value of the first region and a color temperature value of the second region-, the image processing apparatus is further to:

if a difference between the color temperature value of the first region and the color temperature value of the second region is greater than a preset threshold, determine, based on the color temperature value of the first region, a first white balance gain coefficient corresponding to the first region, and determine, based on the color temperature value of the second region, a second white balance gain coefficient corresponding to the second region;

determine a fifth white balance gain coefficient based on the first white balance gain coefficient and the second white balance gain coefficient, wherein the fifth white balance gain coefficient is used to correct the critical region; and perform the white balance correction on the image based on the first white balance gain coefficient, the second white balance gain coefficient, and the fifth white balance gain coefficient.

19. The apparatus according to claim 17, wherein the performing the region division on the image based on the contour line of the detection object-, the image processing apparatus is further to:

generate a first bounding box of the detection object;

determine, in an image region comprised in a second bounding box, a region contour line that comprises a largest image area as the contour line of the detection object, wherein the second bounding box is obtained by extending the first bounding box outwards; and perform the region division on the image based on the contour line of the detection object, wherein the first region is an image region comprised in the contour line, and the second region is an image region outside the contour line.

20. A non-transitory computer-readable storage medium, wherein the computer-readable storage medium is configured to store instructions; and when the instructions are executed by a processor, cause the processor to:

obtain an image, wherein the image comprises a detection object;

determine, based on a detected environment of a mobile station, whether the image is affected by light sources of at least two different color temperatures;

in response to determining that the image is affected by light sources of at least two different color temperatures, perform region division on the image based on the detection object to obtain image regions, wherein the obtained image regions comprise a first region and a second region, the first region comprises the detection object, and the second region does not comprise the detection object; and perform white balance correction on the image based on a color temperature value of the first region and a color temperature value of the second region.

* * * * *